(12) United States Patent
Delatorre

(10) Patent No.: US 8,181,539 B2
(45) Date of Patent: May 22, 2012

(54) PRESSURE ISOLATED STRAIN GAUGE TORQUE SENSOR

(76) Inventor: Leroy C. Delatorre, Houston, TX (US)

(*) Notice: Subject to any disclaimer, the term of this patent is extended or adjusted under 35 U.S.C. 154(b) by 218 days.

(21) Appl. No.: 12/802,014

(22) Filed: May 27, 2010

(65) Prior Publication Data

US 2011/0000320 A1    Jan. 6, 2011

Related U.S. Application Data

(60) Provisional application No. 61/270,195, filed on Jul. 6, 2009.

(51) Int. Cl.
*G01L 1/22* (2006.01)
(52) U.S. Cl. .................. 73/862.338; 73/862.08
(58) Field of Classification Search .......... 73/795, 73/862.08, 862.338
See application file for complete search history.

(56) References Cited

U.S. PATENT DOCUMENTS

| | | | |
|---|---|---|---|
| 3,864,968 A * | 2/1975 | Anderson | 73/152.59 |
| 4,651,569 A | 3/1987 | Paros et al. | |
| 4,907,168 A * | 3/1990 | Boggs | 702/41 |
| 5,463,903 A | 11/1995 | Delatorre | |
| 6,807,871 B1 | 10/2004 | Paek | |
| 6,938,464 B1 * | 9/2005 | Bi | 73/54.28 |
| 7,654,158 B2 * | 2/2010 | Weems | 73/862.193 |

* cited by examiner

*Primary Examiner* — Max Noori
(74) *Attorney, Agent, or Firm* — W. Allen Marcontell

(57) ABSTRACT

A fluid parameter measuring instrument relies upon a torque transmitting member comprising an integrally joined and substantially concentric shaft within a tube to transfer torsional stress across a pressure differential barrier without a penetration aperture seal. On one environmental side of the barrier, a pair of thin wall beams having strain gauges secured thereto are secured proximate of the beam mid-points to the torque transmitting member and the opposite ends to barrier structure. The strain gauges are connected in an electrical balance circuit to measure torque as a function of stress on the beams.

15 Claims, 5 Drawing Sheets

PRESSURE ISOLATED STRAIN GAUGE TORQUE SENSOR

CROSS-REFERENCE TO RELATED APPLICATION

The priority date benefit of Provisional Application No. 61/270,195 titled Pressure Isolated Strain Gauge Sensor filed Jul. 6, 2009 is claimed for this application.

BACKGROUND OF THE INVENTION

1. Field of the Invention

This invention relates to a strain gauge type torque sensor for measuring precision values of torque generated as a function of fluid parameters existent within an environment separate from the strain gauge elements such as the hostile environment found in an oil or gas well. Specifically, oil or gas well environments often include exposures to such extreme fluid parameters as high temperature, high pressure, corrosive media, shock and vibration. Additional limitations, restrictions or requirements on or of a downhole sensor usually include a small diametrical size, low power consumption and the ability to make accurate measurements in the presence of all of these factors.

2. Description of Related Art

Torque is often measured by the utilization of strain gauges in various configurations. These types of measurement techniques, however, are generally limited to values of torque that are high enough to create measurable strain levels within a shaft or torsion element. Also, these configurations would normally only lend themselves to physical configurations that preclude routing of associated sensor wiring within a fluid media. These criteria are often not met when measurements are to be made below the surface, as in an oil or gas well. Additionally, torque output responses derived from physical measurements often require that the torque should be measured primarily as a force imposed upon a lever of known length rather than as a material displacement. It is an object of this invention, then, to provide a strain gauge type torque sensor, suitable for use with precision physical measurement devices which develop a torque parameter output within a hostile well environment.

SUMMARY OF THE INVENTION

A torque measurement system for fluid medium comprises a frictionless pressure isolator to couple torque from a well fluid environment into an instrument environment, and a strain gauge based torque sensor for measurement within the instrument environment. The input torque is transmitted by means of a shaft, immersed within the well pressure media, to a pressure isolator tube. Torque transmitted by the pressure isolator tube is then coupled to small, thin beams which are designed to support strain gauges which respond solely to tension and/or compression. This approach, as opposed to the more conventional measurement of shear or bending stress, allows very small values of torque, which may be present in a high pressure environment, to be accurately measured. This is also accomplished with a very low resultant input torque displacement response.

Two embodiments of the design are described with different advantages for each. Additionally, the two embodiments share common design features that allow them to reject external vibration and provide isolation from coupling to the external support housing.

BRIEF DESCRIPTION OF THE DRAWINGS

The advantages and further features of the invention will be readily appreciated by those of ordinary skill in the art as the same becomes better understood by reference to the following detailed description when considered in conjunction with the accompanying drawings in which like reference characters designate like or similar elements throughout.

DESCRIPTION OF THE PREFERRED EMBODIMENTS

Figure 1:
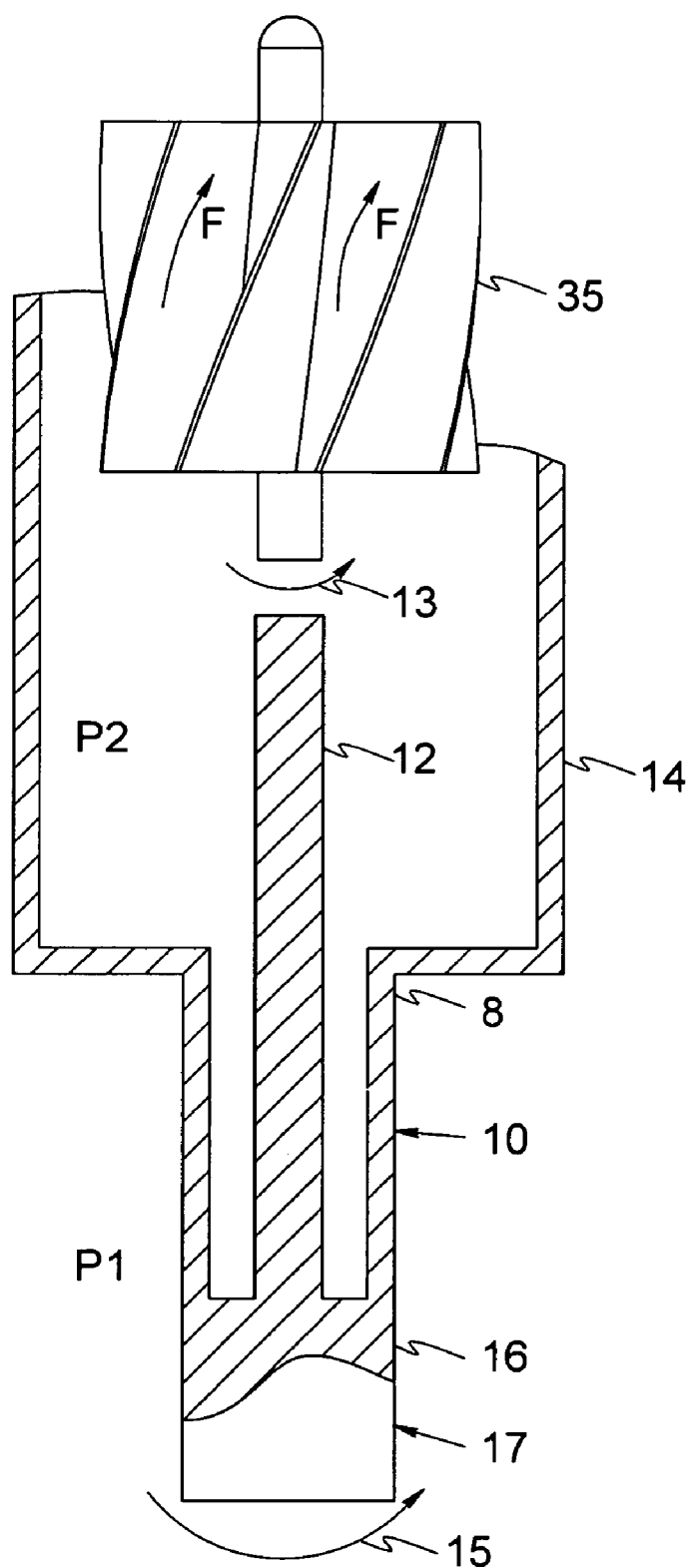
FIG. 1 is an illustration of a pressure isolation tube assembly.

FIG. 1 depicts a pressure isolation tube, 10, mounted at its open end 18 to an environmental isolation structure such as a pressure vessel, 14, and closed at its other end, 16. The closed end 16 is also integral to a co-axial shaft, 17. Shaft, 12, is also mounted to the closed end 16 of the isolation tube 10. The torque transfer elements of the invention comprising shafts 12 and 17 and isolation tube 10 are all structurally integral and co-axial, any torque 15 applied to shaft 17 will result in a proportional torque 13 on the shaft 12. Those of ordinary skill will also understand that the shaft 17 may be either solid rod structure or of smaller O.D. tube Those of ordinary skill in the art will also understand that the description "structurally integral" does not necessarily mean that all appendages 10, 12, and 17 are all formed from a single material monolith. Each appendage may be formed separately and assembled into a rigid unit.

Numerous physical parameters may be translated into torque. For example, a turbine stator 35 may be designed to induce a torque 13 upon the shaft 12 that is proportional to the velocity of a fluid F passing through the stator 35. When the stator is positioned in a conduit of known cross-sectional area, that velocity may be translated by instrument calibration into a rate or volume of fluid flow per unit of time. Hence, the stator 35 is merely one form of torque generating structure for quantifying other fluid parameters.

FIG. 1, also shows a pressure $P_1$ on one side of pressure vessel, 14, and pressure, $P_2$, on the other. A pressure difference between $P_1$ and $P_2$ will result in an insignificant torque component in the output torque if the rotational displacement of isolation tube 10 is kept small with respect to its zero value. Therefore pressure isolation is provided without a friction or pressure effect on the torque measured. It is also apparent that this structure can be designed for either $P_1$ or $P_2$ to be a well fluid environment and that the input can be either torque, 13, or torque, 15.

Strain gauge sensors, as the name implies, are electrical devices that respond to strain. Traditionally, strain gauges are intimately bonded to a substrate surface. Strain is the dimensional displacement or distortion of a material that results from the application of a force on a body of the material which constitutes the substrate. The degree of strain on the body is dependent on the magnitude of the applied force, as well as the physical dimensions of the body acted upon by the force. This force, in the case of a low level torque, is also low and will generally also result in corresponding low levels of strain. This, then, will result in strain gauge responses which may be small with respect to other error effects, such as temperature sensitivities or instrumentation inaccuracies. An objective, then, for measuring low level torque is to be able to increase the strain levels related to the measurement.

Conventional methods of measuring torque with strain gauges do not meet these criteria without also requiring a relatively large rotational displacement of the substrate structure. One such approach, for example, is to mount the strain gauges on a rectangular beam which is axially subjected to the torque to be measured. If the beam is made thin then a relatively large twist is required to get significant strains. This can be largely remedied by making the beam thick but, then, relatively large levels of torque are required to produce the desired output response. The result is that this approach does not lend itself to those measurements which simultaneously require sensitivity to low torque and low displacement.

Figure 2:
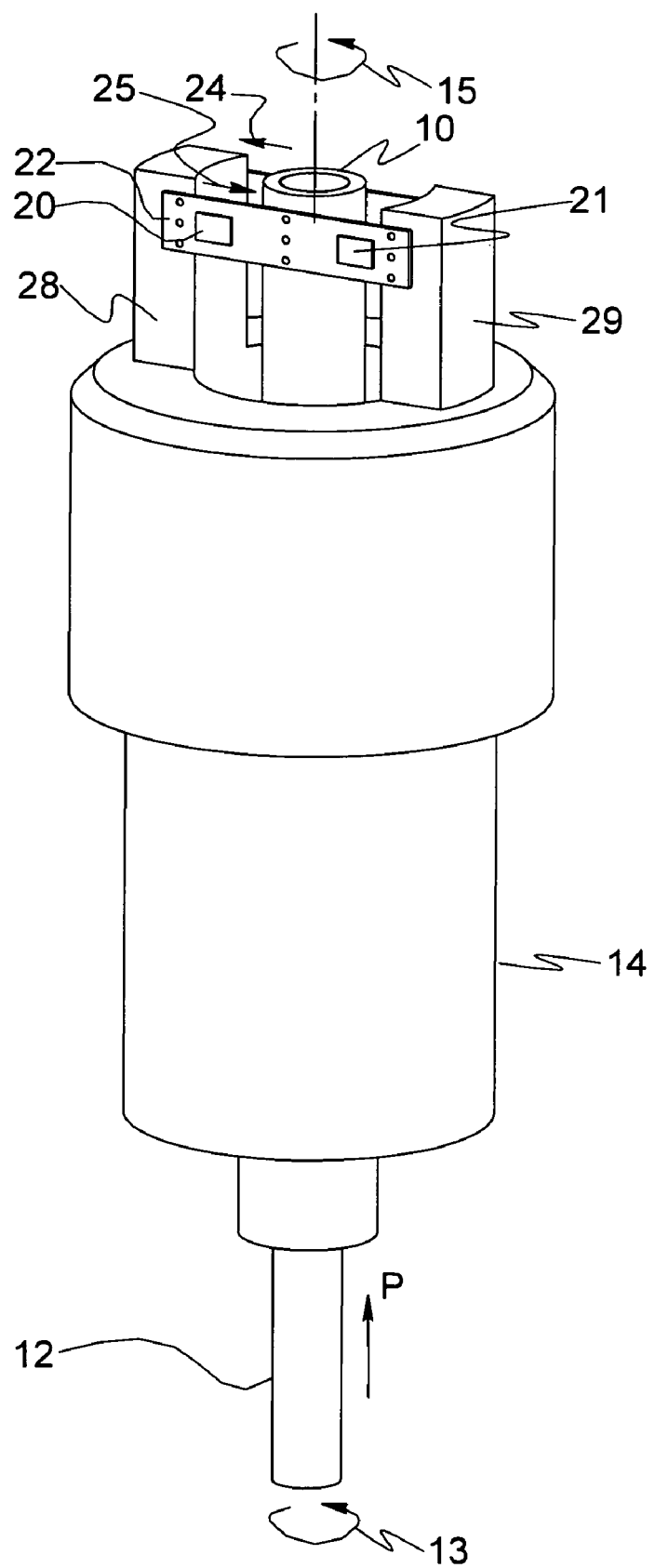
FIG. 2 is an illustration of the strain gauge mounting structure for measuring torque.
Figure 3:
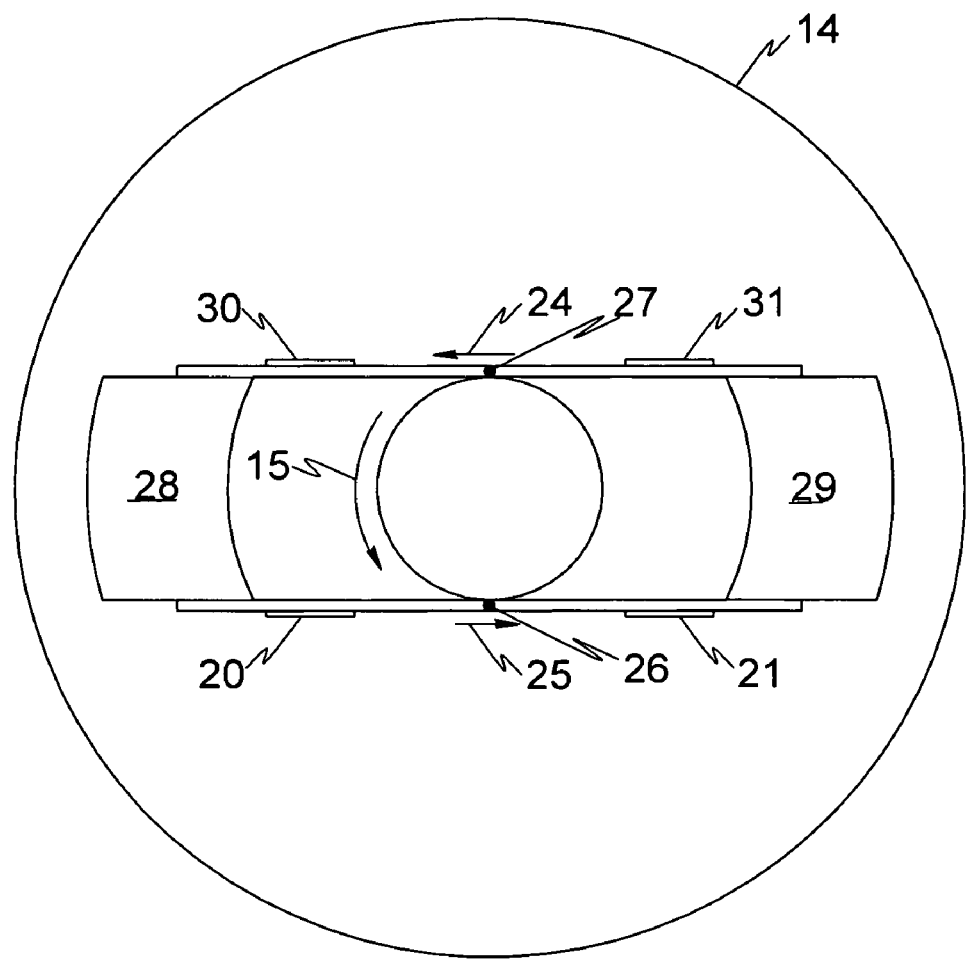
FIG. 3 is a top view of FIG. 2.
Figure 4:
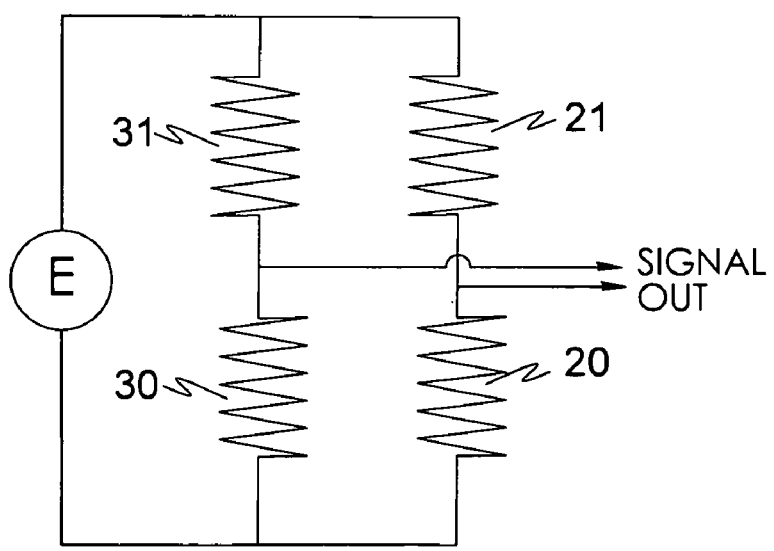
FIG. 4 is an illustration of the position of each strain gauge within a bridge circuit.

FIGS. 2 and 3, illustrate the basic strain gauge mounting configuration of this invention, which serves to overcome these limitations. As an aid to further illustration the reference numbers or characters of FIGS. 1, 2, 3 and 4 all correspond to the same or similar elements. Referring back to FIG. 2, the pressure isolation tube 10 is shown attached to a pressure vessel 14 at its base. Additionally, the top of the pressure isolation tube shaft, 17, is attached, to the midpoints of two strain gauge substrates comprising thin beams 22 and 23. Representatively, the substrate beams 22 and 23 may be thin strips of stainless steel foil. The substrate beams 22 and 23 are attached to the shaft 17 at its diametrically opposite tangent points 26 and 27 by spot welding, for example. Also, the respective ends of these beams are similarly attached to anchor posts 28 and 29 so that any torque, 15, will result in tensile and compressive forces 24 and 25 within the beam halves of 22 and 23 attached to post 28 and opposite forces within the beam halves attached to post 29. These forces are then sensed by strain gauges 20, 21, 30 and 31 which are applied intimately to the surface of substrate beams 22 and 23 by a suitable bonding agent such as epoxy. The strain gauges 20, 21. 30. and 31 are electrically connected to form the four legs of a full bridge circuit. This circuit is shown in FIG. 4. Each of the gauges, then, will respond to torque to produce a signal which adds to the bridge output.

This structure offers many advantages. First, the force beams, 22 and 23, can easily be dimensioned to provide the required level of sensitivity for the torque-to-strain conversion. This feature provides the ability to measure low stress levels. Next, the deflection of the force beams is simply the strain that is being measured, since no bending is involved. This, then, gives the desired low deflection response. Finally, all of the gauges 20, 21, 30, and 31 contribute an output to the full bridge circuit for torque measurement but mutually cancel each other for other factors, such as position, temperature or vibration. This has the advantages of providing maximum conversion sensitivity along with rejection of temperature effects while improving long term electrical stability. The stability enhancement occurs because matched strain gauges will tend to have long term drifts that track each other and, therefore, cancel in the output.

Also, as shown in FIG. 2, pressure P is applied within the vessel 14 to the inside of the pressure isolator tube, 10. This vessel would normally enclose the strain gauge assembly, for measurement within a well bore, but it is shown here, for simplicity of illustration, as enclosing only the torque shaft 12. The result is the same since, in either case, the external pressure portion of vessel 14 does not envelope the strain gauges 20, 21, 30 and 31. This pressure P represents the external pressure which must be isolated from the strain gauges. It is generally consists of well bore fluid and can have any value from atmospheric to very high pressures, such as 20,000 PSI. If it is a high pressure then it will cause a significant axial expansion of the pressure isolator tube 10 but will impose no circuit imbalance on the full bridge connection.

Figure 5:
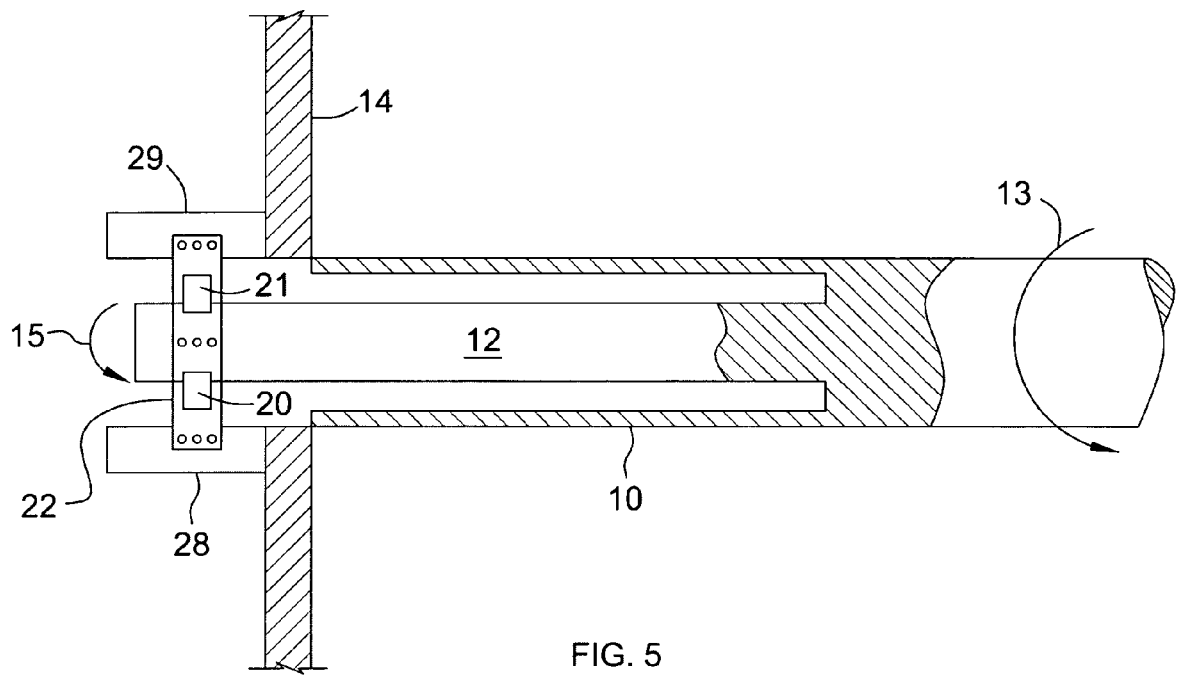
FIG. 5 is an illustration of the torque sensor with external pressure on the pressure isolator tube.

The configuration illustrated in FIG. 2 is for the high pressure P to be on the inside of the pressure isolator tube 10. As discussed for FIG. 1, the high pressure can also be configured to be on the outside of the isolation cylinder, as depicted in FIG. 5. FIGS. 1 and 2 share common designator numbers for clarification.

Both configurations have some advantages and disadvantages and the choice between them is dependent on the application. For example, applying the high pressure to the inside of the pressure isolator tube 10 eliminates the possibility of pressure collapse but it will generally require more clearance between the outside diameter of the internal shaft 12, (FIG. 1) and the inside diameter of the isolator tube 10. For example, an internal fluid is often contaminated and the additional annular clearance between the two diameters makes plugging less likely. The effect of this seemingly insignificant requirement is to increase the torsional rigidity difference between that of the internal shaft 12 and the isolation tube 10. The torsional rigidity of the shaft 12 is automatically less than that of the isolation tube 10 because its outside diameter of the shaft 12 must fit coaxially within the inside diameter of the isolation tube 10. Even a small difference can be very significant because torsional rigidity varies as the fourth power of the outside diameter of a shaft. The end effect of reducing this shaft diameter will be to increase the input torque displacement required for a given output value.

Figure 6:
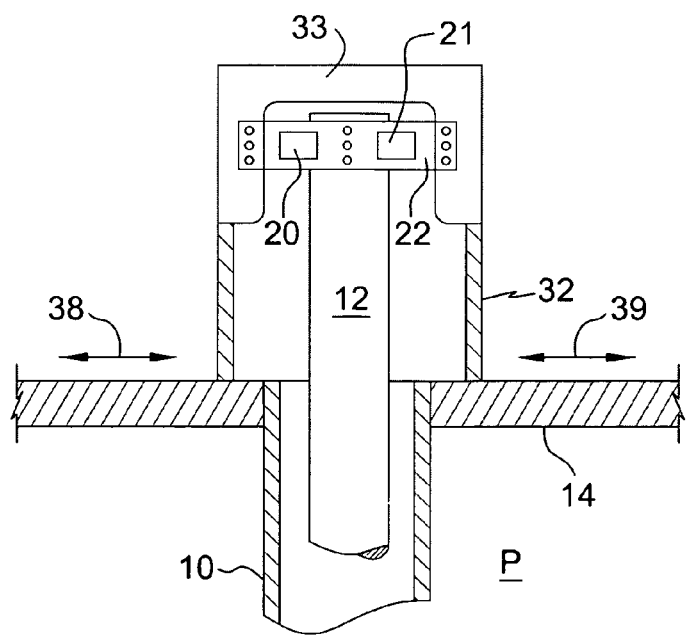
FIG. 6 illustrates a structure for isolating mounting stresses for the torque measurement.
Figure 7:
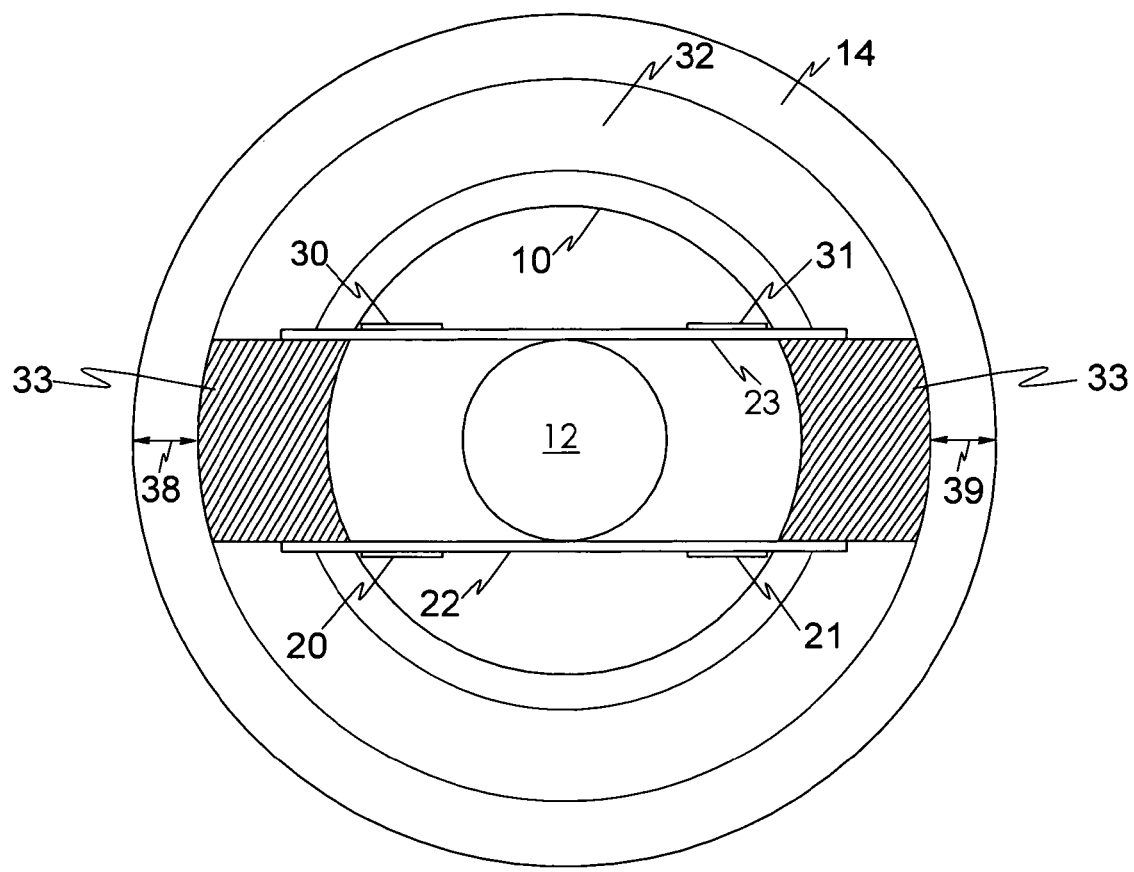
FIG. 7 is a top view of FIG. 6.

Any undesired measurement effects, from non-torque forces, on the torque shaft 17 (FIGS. 2, 6 and 7) will tend to cancel in the strain gauge bridge output but this is not necessarily the case for forces, such as 38 and 39 which may be externally induced into the pressure vessel mounting 14. This issue is addressed in FIG. 6 where the mounting pylons 28 and 29 of FIG. 2 have been replaced by a relatively thin walled cylinder 32 that is bridged by a rigid beam structure 33. These are also seen in a top view in FIG. 7. The purpose of thin walled cylinder 32 is to isolate any stresses 38 and 39 in the mounting 14 from having any significant effect on the strain gauge beams 22 and 23. It is well known that stresses applied to one end of a long, thin walled cylinder will die out rapidly along the length of the cylinder. The thin walled cylinder 32, however, is very effective in resisting torque moments about its axis by virtue of its relatively large diameter, as compared to the torque shaft 12. This is important because the loading of beam, 33, from the strain gauge beams, 12 and 13, is primarily a torque for a torque input from shaft 12, Additionally, the rigid beam, 33, of FIGS. 6 and 7 serves to further isolate any stresses transmitted from the mounting through the tube 32 and thus provides a rigid, stress free, mounting base for the strain gauge beams, 12 and 13.

It will be apparent to those skilled in the art that various changes may be made in the invention without departing from the spirit and scope thereof and therefore the invention is not limited by that which is disclosed in the drawings and specifications but only as indicated in the appended claims.

Although the invention disclosed herein has been described in terms of specified and presently preferred embodiments which are set forth in detail, it should be understood that this is by illustration only and that the invention is not necessarily limited thereto. Alternative embodiments and operating techniques will become apparent to those of ordinary skill in the art in view of the present disclosure. Accordingly, modifications of the invention are contemplated which may be made without departing from the spirit of the claimed invention.

The invention claimed is:

1. A fluid parameter measuring device comprising:
    first and second coaxial torque transfer elements, each having a first and second ends, relatively aligned at least partially concentric and being integrally joined at said first ends; said first torque element being secured at said second end to an environmental isolation structure to expose said first torque element to a first environment and said second torque element to a second environment;

strain gauge substrate structure secured to said first torque element proximate of said first end and to said environmental isolation structure;

a strain gauge sensor secured to said substrate structure and connected to electrical circuitry; and, a torque generation structure responsive to a fluid parameter secured to the second end of said second torque element.

2. A measuring device as described by claim 1 wherein said first torque element comprises a tubular element having substantially concentric internal and external cylindrical surfaces, said substrate structure being a beam having one end secured to said external cylindrical surface and an opposite end secured to said environmental isolation structure.

3. A measuring device as described by claim 2 wherein said strain gauge sensor is secured to said beam between points of beam attachment to said first torque element and to said environmental isolation structure.

4. A measuring device as described by claim 3 comprising four beams and corresponding sensors, said sensors being electrically connected in a balance circuit.

5. A measuring device as described by claim 1 wherein said first torque element comprises a tubular element having substantially concentric internal and external cylindrical surfaces, said substrate structure being a pair of beams having mid-points secured to said external cylindrical surface and opposite ends secured to said environmental isolation structure.

6. A measuring device as described by claim 5 wherein strain gauge sensors are secured to said beams between points of beam attachment to said first torque element and to said environmental isolation structure.

7. A measuring device as described by claim 6 comprising four sensors electrically connected in a balance circuit.

8. A fluid parameter measuring device comprising:
first and second coaxial torque transfer elements, each having a first and second ends, relatively aligned at least partially concentric and being integrally joined at said first ends; said first torque element being secured at said second end to an environmental isolation structure to expose said first torque element to a first environment and said second torque element to a second environment;

strain gauge substrate structure secured to said second torque element proximate of said second end and to said environmental isolation structure;

a strain gauge sensor secured to said substrate structure and connected to electrical circuitry; and, a torque generation structure responsive to a fluid parameter secured to the first end of said first torque element.

9. A measuring device as described by claim 8 wherein said first torque element comprises a tubular element having substantially concentric internal and external cylindrical surfaces and said second torque element comprises a substantially circular shaft element having a length portion aligned substantially concentrically within the internal cylindrical surface of said first torque element, said substrate structure being a beam having one end secured to said shaft element proximate of said second end and an opposite end secured to said environmental isolation structure.

10. A measuring device as described by claim 9 wherein said strain gauge sensor is secured to said beam between points of beam attachment to said shaft element and to said environmental isolation structure.

11. A measuring device as described by claim 10 comprising four beams and corresponding sensors, said sensors being electrically connected in a balance circuit.

12. A measuring device as described by claim 9 wherein said substrate structure comprises a pair of beams having mid-points secured to said external cylindrical surface and opposite ends secured to said environmental isolation structure.

13. A measuring device as described by claim 12 wherein strain gauge sensors are secured to said beams between points of beam attachment to said shaft element and to said environmental isolation structure.

14. A method of measuring a fluid parameter comprising the steps of:
providing first and second co-axial torque transfer elements, said first torque transfer element having substantially concentric internal and external cylindrical surfaces, integrally securing a first end of said first torque element to a first end of said second torque element with an external surface of said second torque element being substantially concentric with said internal surface of said first torque element;

securing a second end of said first torque element to an environmental isolation structure;

exposing said first torque element internal surface to a first fluid environment;

exposing said second torque element external surface to a second fluid environment;

securing strain gauge substrate structure to said first torque element exterior surface and to said environmental isolation structure;

securing a strain gauge to said substrate structure;

securing torque generation structure to said second end of said second torque element; and, connecting said strain gauge to electric circuitry to measure values of torque imposed upon said torque transfer elements by said torque generation structure.

15. A method of measuring a fluid parameter comprising the steps of:
providing first and second co-axial torque transfer elements, said torque transfer elements being partially concentric integrally securing a first end of said first torque transfer element to a first end of said second torque transfer element;

securing a second end of said first torque transfer element to an environmental isolation structure;

exposing an interior surface of said first torque transfer element to a first fluid environment;

exposing an exterior surface of said second torque transfer element to a second fluid environment;

securing strain gauge substrate structure to said second torque transfer element exterior surface and to said environmental isolation structure;

securing a strain gauge to said substrate structure;

securing torque generation structure to said first end of said first torque transfer element; and, connecting said strain gauge to electric circuitry to measure values of torque imposed upon said torque transfer elements by said torque generation structure.

* * * * *